United States Patent
Yang et al.

(10) Patent No.: US 9,595,817 B2
(45) Date of Patent: Mar. 14, 2017

(54) TRANSFORMER POSITION ADJUSTMENT PREVENTING DEVICE OF SWITCHBOARD

(71) Applicant: LSIS CO., LTD., Anyang-si, Gyeonggi-do (KR)

(72) Inventors: Seung Pil Yang, Cheongju-si (KR); Jong Doo Kim, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/748,069

(22) Filed: Jun. 23, 2015

(65) Prior Publication Data

US 2016/0190779 A1 Jun. 30, 2016

(30) Foreign Application Priority Data

Dec. 31, 2014 (KR) .......................... 10-2014-0196023

(51) Int. Cl.
| | |
|---|---|
| *H02B 11/133* | (2006.01) |
| *E05B 65/00* | (2006.01) |
| *H01H 9/28* | (2006.01) |
| *H02B 1/052* | (2006.01) |

(52) U.S. Cl.
CPC ............ *H02B 11/133* (2013.01); *E05B 65/00* (2013.01); *H01H 9/287* (2013.01); *H02B 1/0526* (2013.01)

(58) Field of Classification Search
CPC ..... E05B 65/00; H02B 1/0526; H02B 11/133; H01H 9/20–2009/288
USPC .............. 361/607, 609, 615, 616; 200/50.21, 200/50.17, 50.02
See application file for complete search history.

(56) References Cited

U.S. PATENT DOCUMENTS

| | | | | |
|---|---|---|---|---|
| 4,926,286 | A * | 5/1990 | Maki ........................ | H02B 1/14 200/50.17 |
| 6,943,999 | B2 * | 9/2005 | Gray .................... | H02B 11/133 361/1 |
| 7,420,133 | B2 * | 9/2008 | Farrow .................. | H01H 9/223 200/50.12 |

(Continued)

FOREIGN PATENT DOCUMENTS

| | | |
|---|---|---|
| CN | 203312684 | 11/2013 |
| EP | 2595261 | 5/2013 |

(Continued)

OTHER PUBLICATIONS

European Patent Office Application Serial No. 15173618.8, Search Report dated May 19, 2016, 7 pages.

*Primary Examiner* — Zachary M Pape
(74) *Attorney, Agent, or Firm* — Lee, Hong, Degerman, Kang & Waimey PC

(57) ABSTRACT

A transformer position adjustment preventing device includes a case having a handle insertion unit formed therein, a position displaying unit disposed in the case and displaying a test position or an operation position of a transformer truck with a transformer seated thereon, a rotating member disposed in the case, connected to the position displaying unit, rotated by the rotation of the position displaying unit to open or close the handle insertion unit, and a restricting member rotated in a direction of the rotating member or an opposite direction of the rotating member according to opening or closing of a door opening and closing the transformer chamber in which the transformer truck is disposed, so as to restrict the rotation of the rotating member or release the restriction state.

20 Claims, 23 Drawing Sheets

(56) References Cited

U.S. PATENT DOCUMENTS

| | | | |
|---|---|---|---|
| 8,212,164 B2* | 7/2012 | Waynick, Sr. | H01H 9/00 200/50.24 |
| 2002/0100667 A1 | 8/2002 | Leccia | |
| 2015/0102608 A1* | 4/2015 | Kim | H01H 9/22 292/140 |
| 2015/0221458 A1* | 8/2015 | Oneufer | H01H 9/223 200/43.15 |
| 2015/0380910 A1* | 12/2015 | Oneufer | H02B 1/46 361/622 |
| 2016/0126028 A1* | 5/2016 | Mun | H02B 11/133 200/50.12 |
| 2016/0190778 A1* | 6/2016 | Yang | H02B 11/10 361/606 |
| 2016/0190779 A1* | 6/2016 | Yang | H02B 11/133 361/607 |

FOREIGN PATENT DOCUMENTS

| | | |
|---|---|---|
| JP | 3-270610 | 12/1991 |
| JP | 10256739 | 9/1998 |
| JP | 2013-150375 | 8/2013 |
| JP | 2014-003573 | 1/2014 |
| KR | 20-0340100 | 1/2004 |
| KR | 20-0340578 | 2/2004 |
| KR | 10-2006-0072697 | 6/2006 |
| KR | 10-2011-0016067 | 2/2011 |

* cited by examiner

TRANSFORMER POSITION ADJUSTMENT PREVENTING DEVICE OF SWITCHBOARD

CROSS-REFERENCE TO RELATED APPLICATIONS

Pursuant to 35 U.S.C. §119(a), this application claims the benefit of earlier filing date and right of priority to Korean Patent Application No. 10-2014-0196023, filed on Dec. 31, 2014, the contents of which are hereby incorporated by reference herein in its entirety.

BACKGROUND

The present disclosure relates to a switchboard and, more specifically, to a transformer position adjustment preventing device of a switchboard by which the position adjustment of a transformer disposed in a transformer chamber can be prevented.

Generally, a circuit breaker is an electricity protection device for protecting a load device and a cable route from a fault current during an accident such as a short circuit or earth fault generated on an electric circuit.

Depending on a type of an extinguishing medium, the circuit breaker may be classified into an oil circuit breaker using oil as an extinguishing medium, a gas circuit breaker using a sulfur hexafluoride ($SF_6$) gas which is an inert gas, an air circuit breaker using air as an extinguishing medium, a circuit breaker using magnetism, and a vacuum circuit breaker using vacuum dielectric strength.

Currently, most of electric power device products use a sulfur hexafluoride gas having excellent arc extinguishing and insulating property, but the sulfur hexafluoride gas causes a greenhouse effect of 23,900 times more than carbon dioxide, so that it is being globally restricted to use the sulfur hexafluoride gas.

Environmentally-friendly electric power device products that can replace the sulfur hexafluoride gas are actively developed in Korea, and a demand for a vacuum circuit breaker as one of the environmentally-friendly electric power device products is remarkably increasing.

The vacuum circuit breaker mainly plays a role of controlling electricity transportation and protecting an electric power system, has a large breaking capacity, exhibits high reliability and stability, and can be disposed even in a small installation space, so that the applied range of the vacuum circuit breaker is extending from a medium voltage to a high voltage.

The vacuum circuit breaker is installed along with a switchboard for accommodating and managing several sorts of electrical instruments including a circuit breaker therein so as to operate or control a power plant and a substation and operate a motor, and the vacuum circuit breaker is used as being accommodated in a cradle fixed on the switchboard.

The switchboard equipped with the vacuum circuit breaker has a transformer chamber disposed below the cradle and a transformer installed inside the transformer chamber, and the transformer is seated on a transformer truck as similar to the circuit breaker and is then moved to a test position for maintenance and an operation position for transformation by coming in contact with a load terminal.

FIG. 1 is a perspective view illustrating the inside of a related art switchboard.

As illustrated in FIG. 1, a switchboard 10 equipped with a vacuum circuit breaker includes a vacuum circuit breaker chamber 11 provided with a vacuum circuit breaker 12, and a transformer chamber 13 disposed below the vacuum circuit breaker chamber 11 and provided with a transformer 14, wherein the transformer chamber 13 is able to be opened using a transformer door 17.

The vacuum circuit breaker chamber 11 is provided with the vacuum circuit breaker 12. In the transformer chamber 13, the transformer 14 seated on a transformer truck 16 is moved therein to a test position or an operation position, wherein a power fuse 18 is disposed over the transformer 14 and a ground switch 15 is disposed on the rear surface of the switchboard 10.

Like above, in the related art switchboard, when the power fuse 18 blows due to the occurrence of a fault voltage, the power fuse 18 should be replaced. Here, the power fuse 18 is replaced after the transformer door 17 is opened to withdraw the transformer truck 16 irrespective of whether the ground switch 15 is at an input position or an open position.

However, even when the transformer 14 is moved to a test position after a fault voltage occurs, a residual voltage remains in the transformer 14 and load terminal. Therefore, maintenance should be performed after the remaining residual voltage is removed by allowing the ground switch 15 to be at the input position, however, the transformer door 17 may be opened without a stabilizer while the ground switch 15 is not at the input position, thereby causing a problem in that a worker has a great danger of encountering electric shock while the residual voltage remains in the transformer chamber 13.

SUMMARY

Embodiments provide a transformer position adjustment preventing device capable of restricting the movement of a transformer truck having a transformer seated thereon to a test position or an operation position while a door installed on a switchboard is opened.

In one embodiment, a transformer position adjustment preventing device includes: a case having a handle insertion unit; a position displaying unit disposed in the case and displaying a test position or an operation position of a transformer truck with a transformer seated thereon; a rotating member disposed in the case, connected to the position displaying unit, rotated by the rotation of the position displaying unit to open or close the handle insertion unit; and a restricting member rotated in a direction of the rotating member or an opposite direction of the rotating member according to opening or closing of a door configured to open and close the transformer chamber in which the transformer truck is positioned, so as to restrict the rotation of the rotating member or release the restriction state.

The position displaying unit may include: a front cover having a displaying unit to display a test position or an operation position of the transformer truck, and a catch groove to correspond to the test position or operation position; a rotor rotatably fitted into the front cover and having a through-hole defined in the center thereof; and a locking body disposed to pass through the through-hole and having a first catch protrusion to be selectively fitted into the catch groove.

The front cover may have a box shape, the displaying unit may be disposed on the front surface of the front cover, and the catch groove may be defined inside the front cover.

The rotating member may be connected to the rotor.

An elastic member seating groove may be further defined in the rear of the locking body, the position displaying unit may further include an elastic member that elastically supports the locking body, and the elastic member may be seated in the elastic member seating groove.

A catch projection protruding toward the through-hole may be provided on the rotor, and a second catch protrusion contacting the catch projection when forwardly moved may be provided on the locking body.

The locking body may further include a handle hole at a front portion thereof.

A pressing plate capable of pressing the restricting member may be protrusively disposed on the door.

The restricting member may include: a body plate rotatably connected to the inside of the case, and rotated by receiving the elastic force of an elastic member; a contact rod disposed on the body plate to correspond to the pressing plate and extending toward a door, so that the contact rod is moved toward the rear of the rotating member according to the movement of the door while being in contact with the pressing plate when the door is closed and the contact rod is moved toward the rotating member according to the rotation of the body plate when the door is opened; and one or more rotating member stoppers disposed on the body plate and restricting the rotation of the rotating member by moving toward the rear of the rotating member according to the movement of the body plate when the door is closed and by moving toward the rotating member according to the rotation of the body plate when the door is opened.

A contact plate that contacts the pressing plate and is bent vertically may be disposed on the contact rod.

The body plate may be rotatably connected to a hinge unit in the case, and the elastic member may be a torsion spring that elastically supports the body plate to allow the body plate to be rotated about the hinge unit in a forward direction.

The rotating member may include: a first rotary bar; and a second rotary bar forming a curved shape together with the first rotary bar.

The first rotary bar and second rotary bar may cross each other at a right angle.

The rotating member stopper may include a pair of protrusion portions spaced from each other, and a spaced distance between the pair of protrusion portions may be shorter than a long-direction length of each of the first and second rotary bars and longer than a short-direction width of each of the first and second rotary bars.

The rotating member stopper may be forwardly moved to a position at which the rotation of the first rotary bar is restricted when the position displaying unit is located at the test position and the door is opened, and may be backwardly moved to a position at which the restriction of the rotating member is released when the position displaying unit is located at the test position and the door is closed.

A second rotation bar extension rod may be rotatably connected to the second rotary bar, a fitting plate having a fitting hole may be disposed on the door, and the second rotary bar extension bar may be fitted into the fitting hole to limit the opening of the door when the rotor is rotated to the operation position while the door is closed.

A width of each of the first and second rotary bars may gradually increase from one side in which the first rotary bar and second rotary bar are connected to each other to the other side.

A transformer girder may be disposed in the front of the transformer truck, and a mounting plate on which the case is placed may be disposed on the transformer girder.

In another embodiment, a transformer position adjustment preventing device includes: a case having a handle insertion unit; a position displaying unit provided in the case and displaying a test position or an operation position of a transformer truck with a transformer seated thereon; a rotating member disposed in the case, connected to the position displaying unit, rotated by the rotation of the position displaying unit to open or close the handle insertion unit; a restricting member rotated in a direction of the rotating member or an opposite direction of the rotating member according to opening or closing of a door configured to open and close the transformer chamber in which the transformer truck is positioned, so as to restrict the rotation of the rotating member or release the restriction state; a pressing plate disposed on the door to press the restricting member; and a fitting plate disposed on the door and having an fitting hole into which the rotating member is inserted and fitted.

The position displaying unit may include: a front cover having a displaying unit to display a test position or an operation position of the transformer truck, and a catch groove to correspond to the test position or operation position; a rotor rotatably fitted into the front cover, having a through-hole defined in the center thereof, and having a catch projection to protrude toward the through-hole; and a locking body disposed to pass through the through-hole, having a first catch protrusion to be selectively fitted into the catch groove, and having a second catch protrusion formed to contact the catch projection.

The restricting member may include: a body plate rotatably connected to the inside of the case, and rotated by receiving the elastic force of an elastic member; a contact rod disposed on the body plate to correspond to the pressing plate and extending toward a door, so that the contact rod is moved toward the rear of the rotating member according to the movement of the door while being in contact with the pressing plate when the door is closed and the contact rod is moved toward the rotating member according to the rotation of the body plate when the door is opened; and one or more rotating member stoppers disposed on the body plate and restricting the rotation of the rotating member by moving toward the rear of the rotating member according to the movement of the body plate when the door is closed and by moving toward the rotating member according to the rotation of the body plate when the door is opened.

As described above, the transformer position adjustment preventing device according to an embodiment can prevent a change in a closed state of the handle insertion unit through the rotating member by restricting the rotation of the rotating member through the restricting member while the door is opened when the transformer truck is located at the test position or operation position, and an operation handle is inserted through the handle insertion unit, so that the position of the transformer truck may be prevented from being adjusted.

Moreover, when the transformer truck is located at the operation position, the second rotary bar of the rotating member is made to be fitted in the fitting hole defined in the door, so that the opening of the door is prevented when the transformer truck is located at the operation position, such that a worker can be prevented from encountering electric shock.

Furthermore, the second rotary bar extension rod is rotatably connected to the second rotary bar, and the second rotary bar extension rod is disposed to be downwardly rotated when the second rotary bar is horizontally disposed, such that an unnecessary increase in the total volume of the transformer position adjustment preventing device may be prevented when the second rotary bar extension bar is used.

In addition, a width of each of the first and second rotary bars gradually increases from one side in which the first rotary bar and second rotary bar are connected to each other to the other side so that an occupation space is minimized and strength is simultaneously reinforced, and the handle insertion unit is effectively opened or closed through the first rotary bar and second rotary bar 333.

DETAILED DESCRIPTION OF THE EMBODIMENTS

Figure 1:
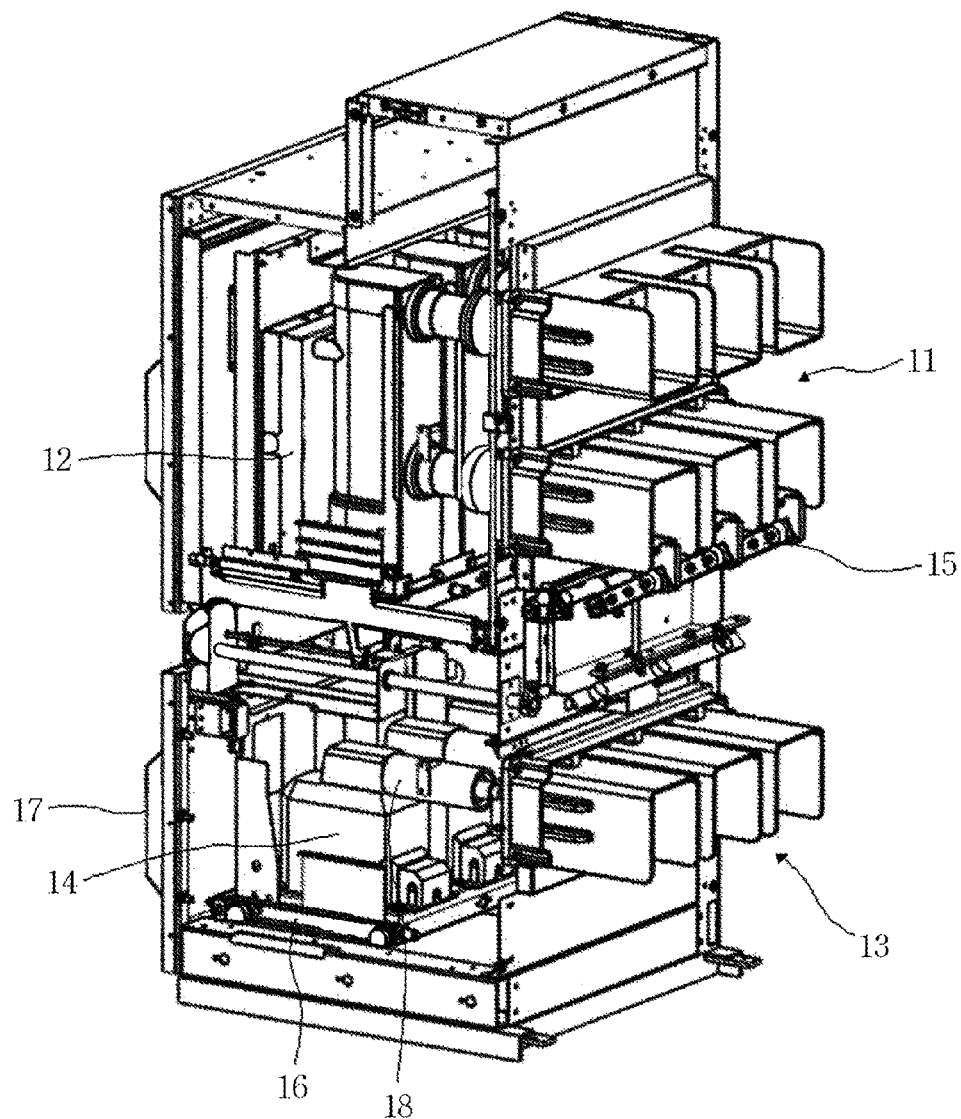
FIG. 1 is a perspective view illustrating the inside of a related art switchboard.
Figure 2:
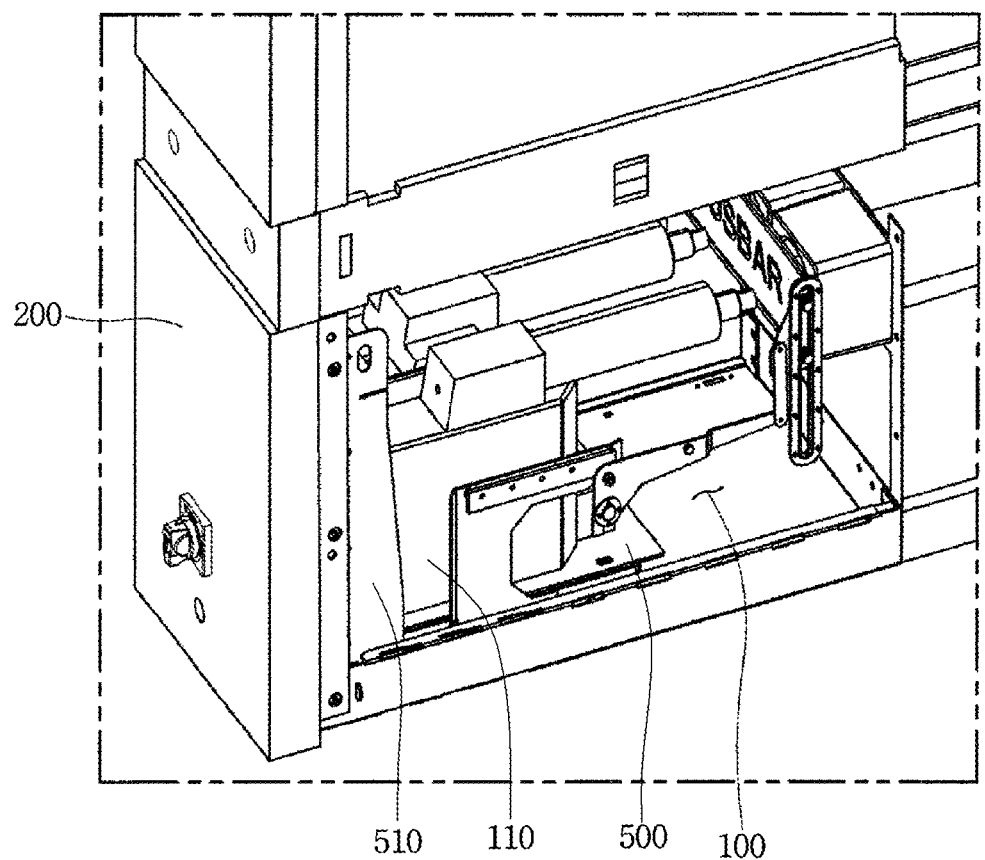
FIG. 2 is a perspective view illustrating a transformer chamber of a switchboard applied with a transformer position adjustment preventing device of a switchboard according to an embodiment.
Figure 3:
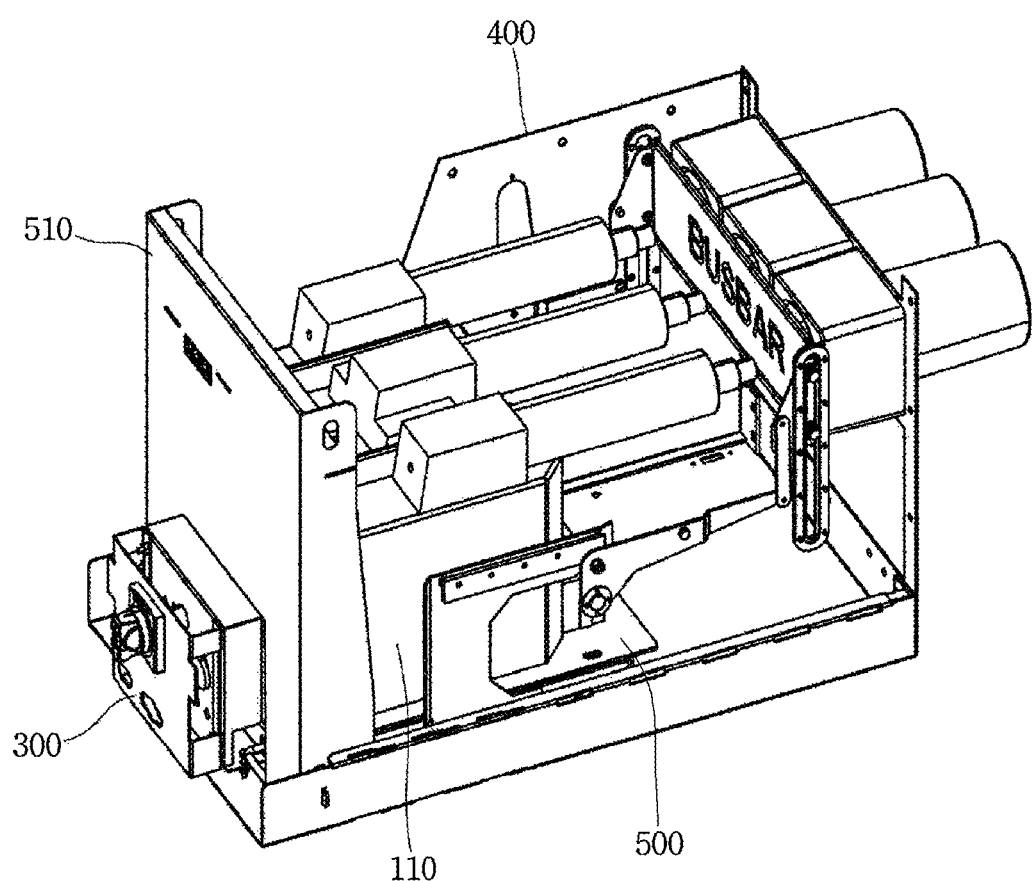
FIG. 3 is a perspective view illustrating a state in which a transformer truck is disposed at a test position inside the transformer chamber in FIG. 2.
Figure 4:
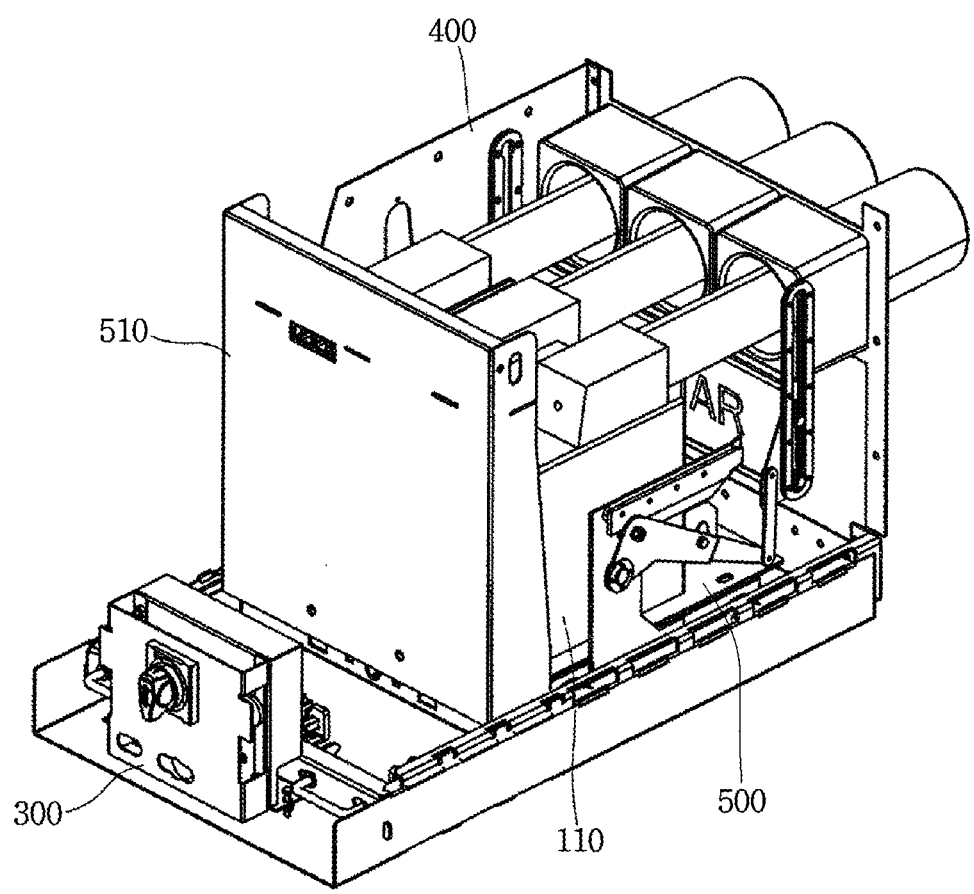
FIG. 4 is a perspective view illustrating a state in which a transformer truck is disposed at an operation position inside the transformer chamber in FIG. 2.
Figure 5:
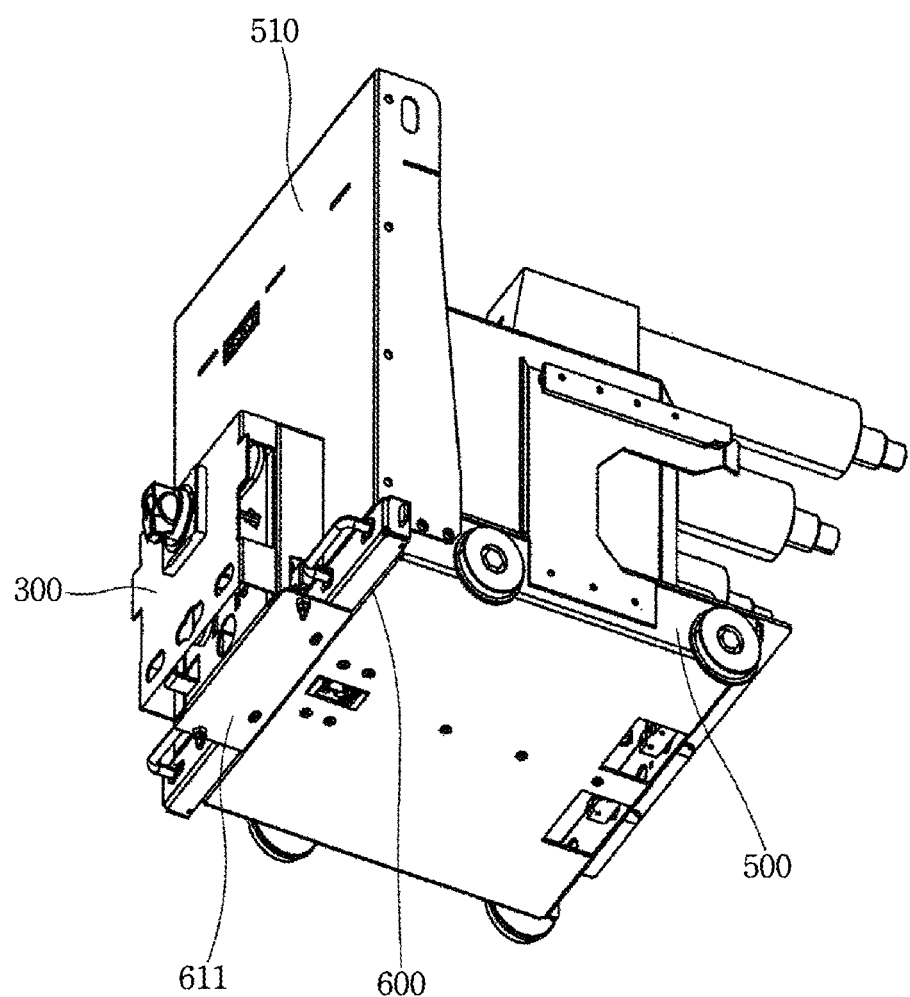
FIG. 5 is a perspective view illustrating both the transformer position adjustment preventing device of a switchboard of an embodiment according to an embodiment and a transformer truck.
Figure 6:
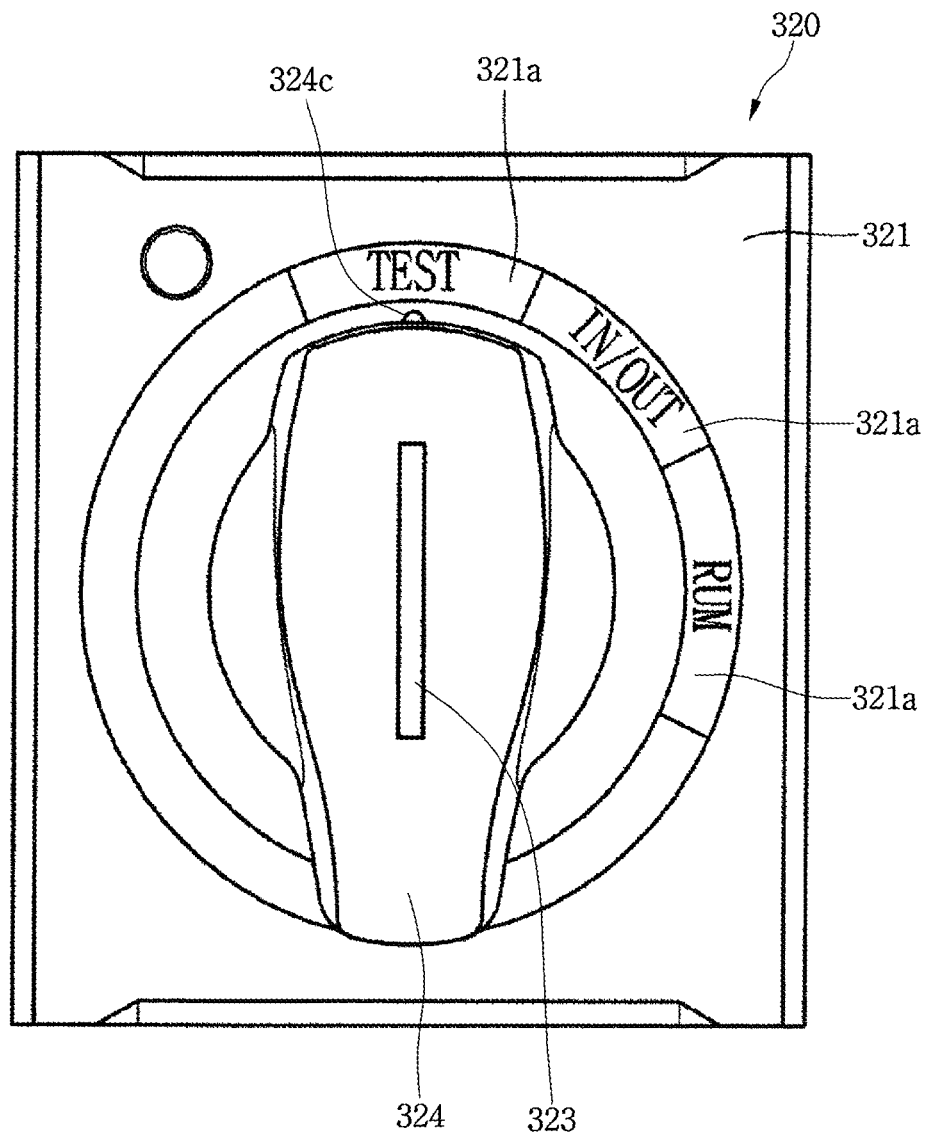
FIG. 6 is a front view illustrating a position displaying unit of the transformer position adjustment preventing device of a switchboard according to an embodiment.
Figure 7:
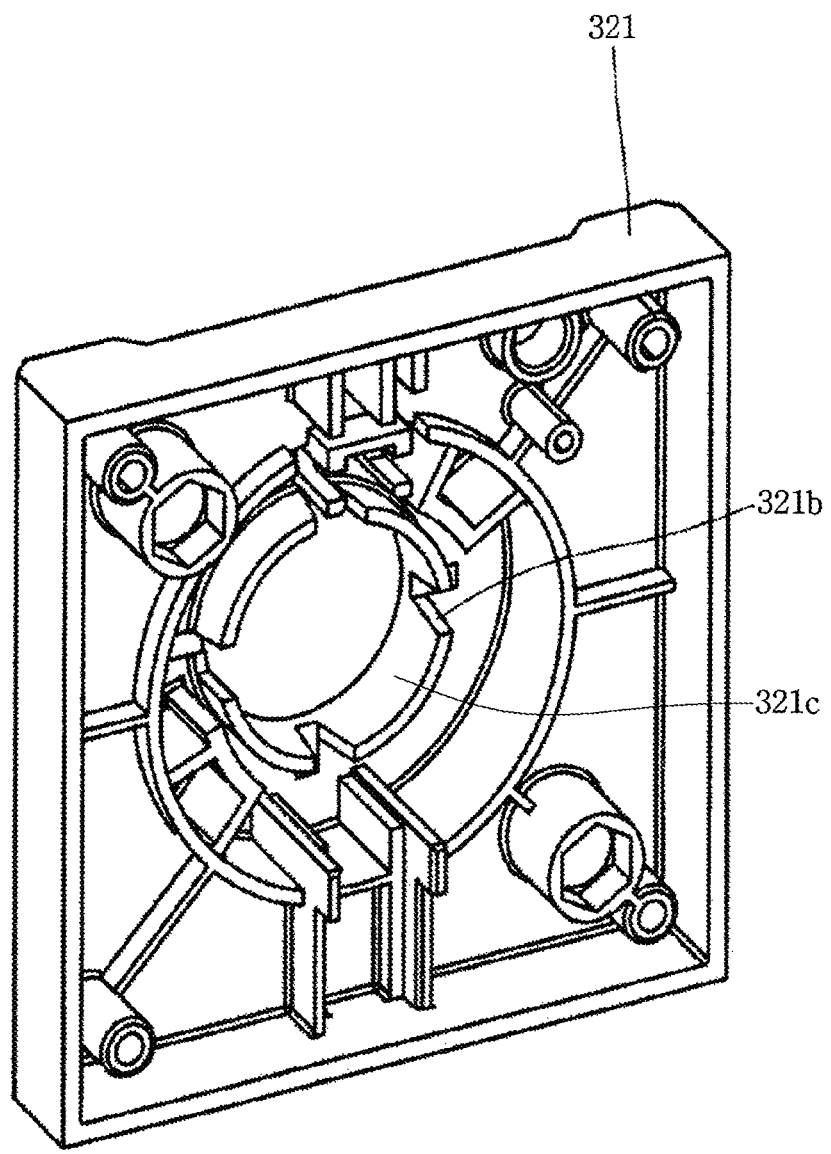
FIG. 7 is a perspective view illustrating a front cover of the transformer position adjustment preventing device of a switchboard according to an embodiment.

A detailed description will be given of a transformer position adjustment preventing device of a switchboard according to an embodiment with reference to the accompanying drawings below.

Referring to FIGS. 2 to 5, a transformer chamber 100 in which a transformer 110 is disposed may be provided in a switchboard to which a transformer position adjustment preventing device according to an embodiment is applied. The switchboard may further include a door 200 that is able to open and close the transformer chamber 100. The door 200 is disposed in the front of the transformer chamber 100 and may close the transformer chamber 100. The door 200 may be rotatably or slidably installed on the switchboard. When rotatably installed on the switchboard, the door 200 is coupled to the switchboard through a hinge to be rotatable about the hinge.

The switchboard may include a transformer truck 500 on which the transformer 110 is seated. A truck cover 510 may be disposed on the front surface of the transformer truck 500. The transformer truck 500 may be disposed in the transformer chamber 100. The switchboard may include a transformer cradle 400 in which the transformer 110 is accommodated. The transformer 110 may be moved into the transformer cradle 400 while being seated on the transformer truck 500. The transformer 110 may be moved to a test position or an operation position and may come in contact with or be separated from a transformer terminal (not shown). At the test position, the transformer 110 can be separated from the transformer terminal. At the operation position, the transformer 110 may come in contact with the transformer terminal. The transformer truck 500 on which the transformer 110 is seated may be moved to the test position of the transformer chamber 100 or the operation position of the transformer chamber 100.

The switchboard may be equipped with a transformer position adjustment preventing device 300 that limits a change in the position of the transformer truck 500 on which the transformer is seated while the door 200 is opened. The transformer position adjustment preventing device 300 may limit a change in the position of the transformer 110 by allowing the position of the transformer truck 500 not to be varied.

The transformer position adjustment preventing device 300 may prevent the movement of the transformer truck 500 with the transformer 110 seated thereon when the door 200 is opened.

A transformer girder 600 may be disposed in the front of the transformer truck 500. The transformer position adjustment preventing device 300 may be disposed on the transformer girder 600. A mounting plate 611 on which the transformer position adjustment preventing device 300 may be mounted may be disposed on the transformer girder 600. The transformer position adjustment preventing device 300 may be disposed while being placed on the mounting plate 611.

Hereinafter, the transformer position adjustment preventing device of a switchboard will be described below with reference to FIGS. 6 to 15.

The transformer position adjustment preventing device 300 may include a case 310, a position displaying unit 320, a rotating member 330, and a restricting member 340.

Figure 18:
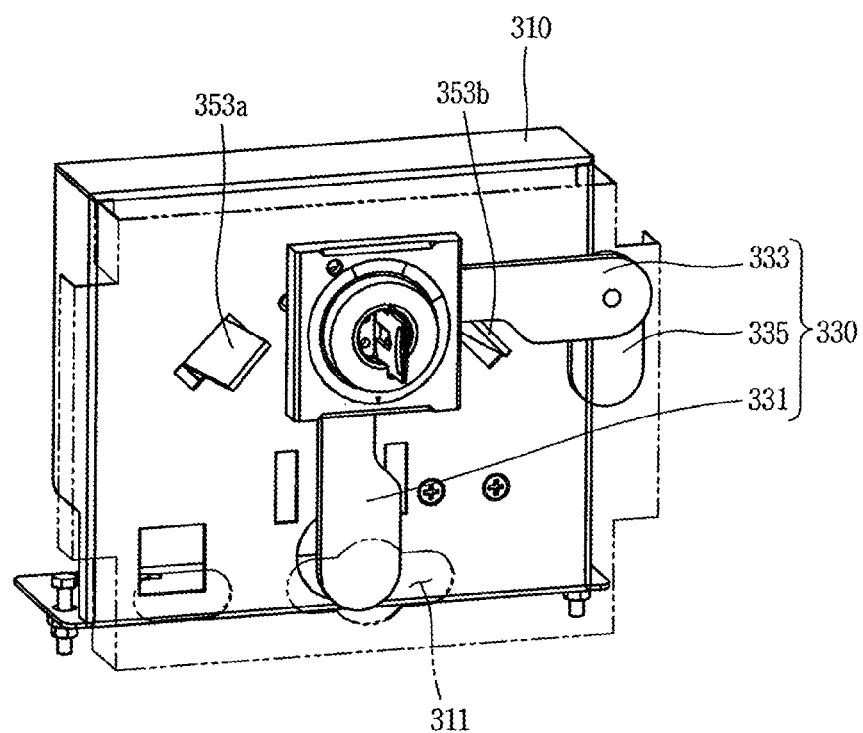
FIG. 18 is a perspective view illustrating the transformer position adjustment preventing device of a switchboard according to an embodiment while a transformer truck is located at a test position.
Figure 20:
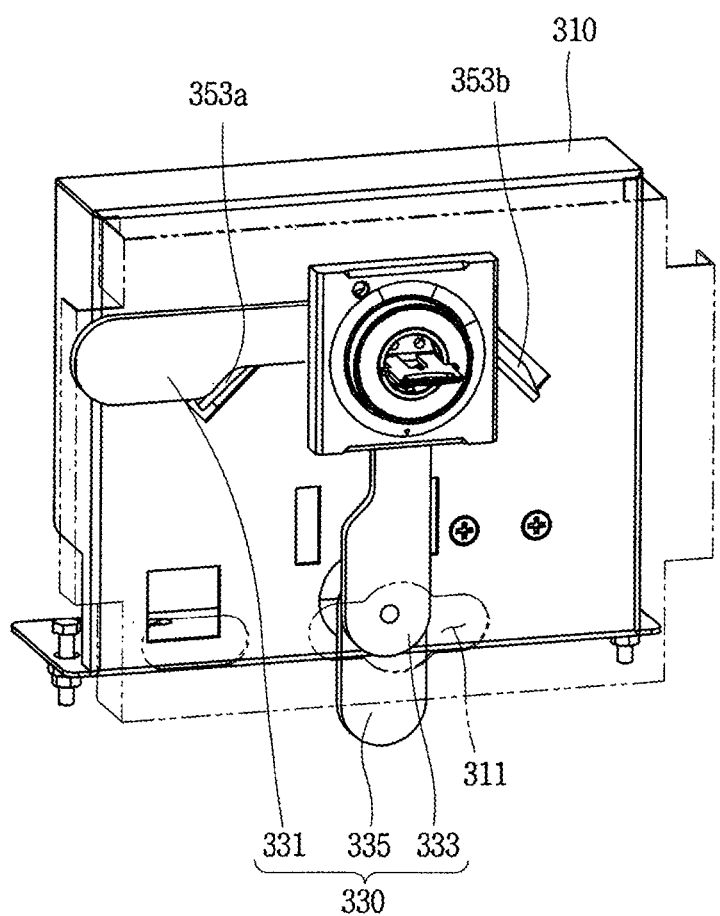
FIG. 20 is a perspective view illustrating the transformer position adjustment preventing device of a switchboard according to an embodiment while a transformer truck is located at an operation position.

A handle insertion unit 311 (Referring to FIGS. 18 and 20) may be provided on the case 310. The case 310 may form the outer appearance of the transformer position adjustment preventing device 300. The case 310 can be disposed while being placed on the mounting plate 611 illustrated in FIG. 5.

The case 310 may be provided with each component of the transformer position adjustment preventing device 300. The transformer truck 500 may be moved to a test position or an operation position by an operation handle (not shown) that operates the transformer truck 500. The operation handle may be connected to the transformer truck 500 by passing through the case 310. The handle insertion unit 311 may be provided such that the operation handle is inserted therein. The handle insertion unit 311 may penetrate through the case 310. The handle insertion unit 311 may be provided in a lower portion of the case 310.

The position displaying unit 320 may be provided in the case 310. The position displaying unit 320 may be disposed in the front of the case 310. According to user's operation, the position displaying unit 320 may display the test position of the transformer truck 500 or the operation position of the transformer truck 500 to be seen from the outside.

The position displaying unit 320 may allow the rotating member 330 to open or close the handle insertion unit 311 by rotating the rotating member 330. The position displaying unit 320 may function to operate the rotating member 330 and determine the position of the rotating member 330.

Moreover, the position displaying unit 320 may be locked without changing a current displaying state.

The position displaying unit 320 described with reference to FIGS. 6 to 9 may include a front cover 321, a rotor 324, and a locking body 323.

A displaying unit 321a for displaying three positions such as a test position (TEST), an operation position (RUN), and an input/output position (IN/OUT) may be disposed on the front cover 321. The displaying unit 321a may include a test position displaying unit, an operation position displaying unit, and an input/output position displaying unit. The front cover 321 may be a sort of a displaying panel configured to display current information about a test position and an operation position to be seen from the outside.

A catch groove 321b may be disposed on the front cover 321 to correspond to the test position or operation position. The catch groove 321b may be provided in plurality on the front cover 321. The plurality of catch grooves 321b may be arranged at intervals of approximately 90°.

The front cover 321 may have a box shape with a rear surface opened. The front cover 321 may have the shape of a rectangular box. The displaying unit 321a may be disposed on the front surface of the front cover 321. The catch groove 321b may be provided inside the front cover 321. A rib may protrude in a rearward direction on a front plate part of the front cover 321, and the catch groove 321b may have a shape dented in the rib 321c. The catch groove 321b may be formed to have an open rear end. The rib 321c may protrude in a hollow cylindrical shape on the rear surface of the front plate part of the front cover 321.

The rotor 324 may be rotatably fitted into the front cover 321, be located at the test position or operation position through rotation, and display the position of the transformer truck 500.

The rotor 324 may be a knob that a user grips and rotates clockwise or counterclockwise. The rotor 324 may be an indicator indicating the test position or operation position. An indicating protrusion 324c that is recognizable by a user may protrude on the outer surface of the rotor 324, and the user may recognize the displaying unit disposed in a direction indicated by the indicating protrusion 324c from among a plurality of the displaying units included in the displaying unit 321a.

A user may recognize the position of the transformer truck 500 by seeing a direction indicated by the rotor 324 s. As an example, when the rotor 324 is lengthily disposed in a direction indicating the test position (TEST) displaying unit of the displaying unit 321a, the user may recognize the transformer truck 500 being currently at the test position. As another example, when the rotor 323 is lengthily disposed in a direction indicating the operation position (RUN) displaying unit of the displaying unit 321a, the user may recognize the transformer truck 500 being currently at the operation position.

A through-hole 324a may be defined in the center of the rotor 324 such that the locking body 323 passes therethrough. A catch projection 324b protruding toward the through-hole 324a is disposed on the rotor 324. The catch projection 324b may be formed at the front end side of the rotor 324 in a stepped form. The catch projection 324b may protrude in a stepped pulley shape on the front end side of the rotor 324. The catch projection 324b may serve as a front stopper preventing the locking body 323 from being excessively withdrawn in a forward direction.

The locking body 323 may be disposed to pass through the through-hole 324a of the rotor 324. The locking body 323 may lock or unlock the rotor 324 by being engaged with or disengaged from the front cover 31.

A first catch protrusion 323a selectively fitted in the catch groove 321b may protrude on the locking body 323. The first catch protrusion 323a may protrude on the rear of the locking body 323.

A second catch protrusion 323c may protrude on the locking body 323 to come in contact with the catch projection 324b. The second catch protrusion 323c may protrude at the center of the locking body 323.

The locking body 323 may be fitted in the catch groove 321b by receiving the elastic force of an elastic member 323e. When the locking body 323 is fitted in the catch groove 321b, the rotation of the locking body 323 may be limited and the rotor 324 may be limited such that the rotor 324 is not freely rotated.

The position displaying unit 320 may further include the elastic member 323e that elastically supports the locking body 323, and the elastic member 323e may pressurize the locking body 323 in a forward direction. When the first catch protrusion 323a is disposed in the rear of the catch groove 321b, the elastic member 323e may elastically pressurize the locking body 323 in a direction in which the first catch protrusion 323a is inserted into the catch groove 321b.

An elastic member seating groove 323d in which the elastic member 323e is seated may be defined in the locking body 323. The elastic member seating groove 323d may be defined in the rear of the locking body 323. The elastic member seating grove 323d may be defined such that a rear surface thereof is opened. The elastic member 323e may be accommodated in the elastic member seating groove 323d. The front end of the elastic member 323e may be connected to an elastic member connection unit provided in the elastic member seating groove 323d.

Figure 8:
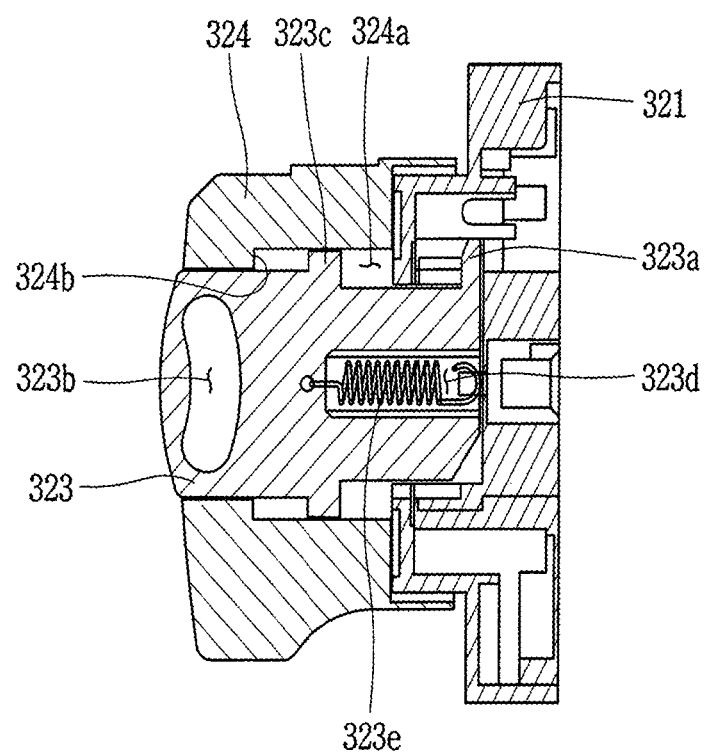
FIG. 8 is a cross-sectional view illustrating a position displaying unit of the transformer position adjustment preventing device of a switchboard according to an embodiment.
Figure 9:
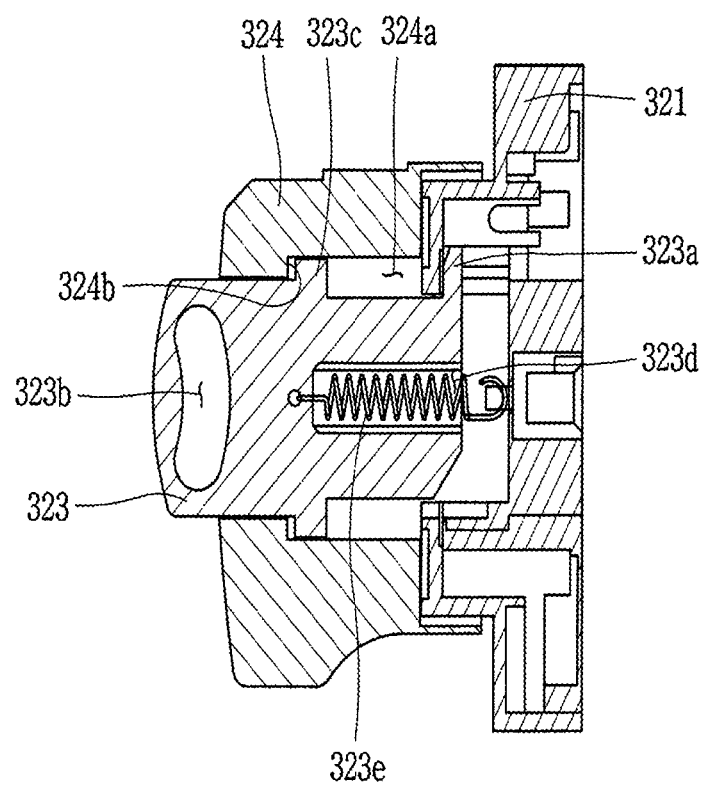
FIG. 9 is a cross-sectional view illustrating a state in which the rotation of the position displaying unit in FIG. 8 is limited.
Figure 10:
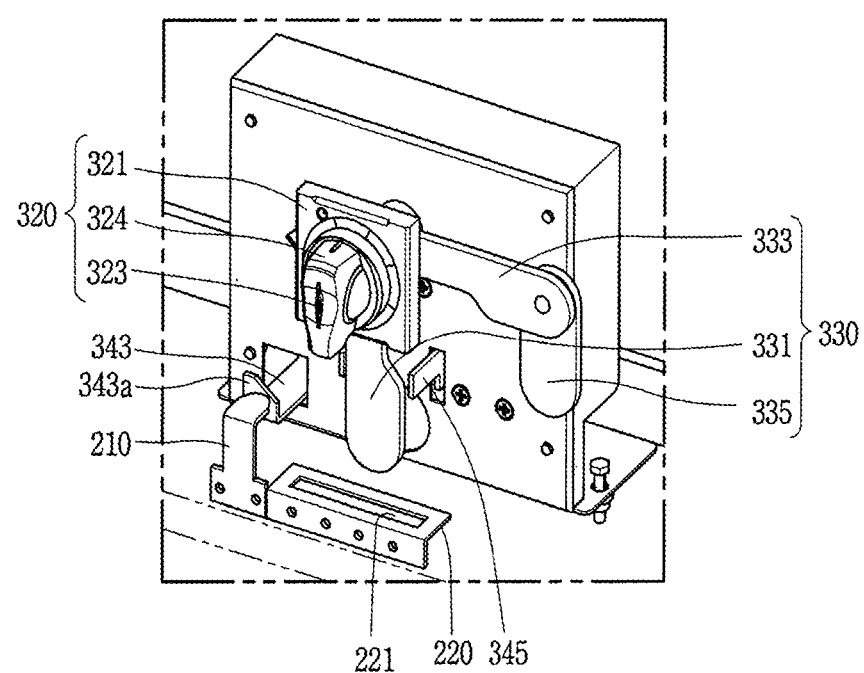
FIG. 10 is a perspective view illustrating a state in which an operation displaying unit of the transformer position adjustment preventing device of a switchboard according to an embodiment is at a test position and a door is closed.

While the first catch protrusion 323a of the locking body 323 is fitted into the catch groove 321b of the front cover 321 to restrict the free rotation of the rotor 324, a user may push the locking body 323 into the switchboard, as illustrated in FIG. 8. In such a case, the first catch protrusion 323a of the locking body 323 may be taken out from the catch groove 321b of the front cover 321, and the locking body 323 may be disengaged from the restriction on the front cover 321 and rotated clockwise and counterclockwise. In this case, a user may rotate the rotor 324 clockwise and counterclockwise, and the rotor 324 may allow the test position or operation position to be variably displayed.

The locking body 323 may further include a handle hole 323b at a front portion thereof. A user may easily move the locking body 323 in front and rearward directions using the handle hole 323b and easily rotate the rotor 324.

The rotating member 330 may be provided on the case 310. The rotating member 330 is connected to the position displaying unit 320 and rotated according to the rotation of the position displaying unit 320 thereby opening or closing the handle insertion unit 311. The rotating member 330 may be a handle insertion unit opening and closing member that opens and closes the handle insertion unit 311.

The rotating member 330 may include a connector 322 connected to the position displaying unit 320, and an opening and closing member 324 connected to the connector 322 to open and close the handle insertion unit 311. A fitting protrusion 322a fitted into the position displaying unit 320 may protrude forwardly on the connector 322. The fitting protrusion 322a may be fitted into the rotor 324 of the position displaying unit 320. A fitting groove unit into which the fitting protrusion 322a is fitted may be formed in the rotor 324, the fitting protrusion 322a may be fitted into the fitting groove unit, and the connector may be rotated along with the rotor 324 by being connected to the rotor 324. A connector fitting hole into which the connector 322 is fitted may be defined in the opening and closing member 324.

The rotating member 330 is made of a single member so that the rotating member 330 may be connected to the position displaying unit 320. In such a case, the rotating member 330 may include a connector unit having the fitting protrusion 322a formed thereon, and an opening and closing unit protruding from the connector unit to open and close the handle insertion unit 311.

The rotating member 330 may include a first rotary bar 331 and a second rotary bar 333 integrally extending from one side of the first rotary bar 331 and forming a curved shape together with the first rotary bar 331.

The first rotary bar 331 and second rotary bar 333 together may constitute the opening and closing member 324. The first rotary bar 331 and second rotary bar 333 may be formed to cross each other at right angles.

The first rotary bar 331 and second rotary bar 333 may selectively open and close the handle insertion unit 311. The handle insertion unit 311 may be shielded by the first rotary bar 331 or shielded by the second rotary bar 333.

When the position displaying unit 320, especially the rotor 324, is rotated, the first rotary bar 331 and second rotary bar 333 may open or close the handle insertion unit 311, and the adjustment of the test position or operation position of the transformer truck 500 may be limited or such limitation may be released. Hereinafter, the detailed structure of the rotating member 330 will be described below.

The restricting member 340 may be provided in the case 310. The restricting member 340 is rotated in a direction of the rotating member 330 or in an opposite direction of the rotating member 330 according to the opening or closing of the door 200, so that the rotation of the rotating member 330 is restricted or such restriction is released. The restricting member 340 may be operated in association with the door 200.

Figure 16:
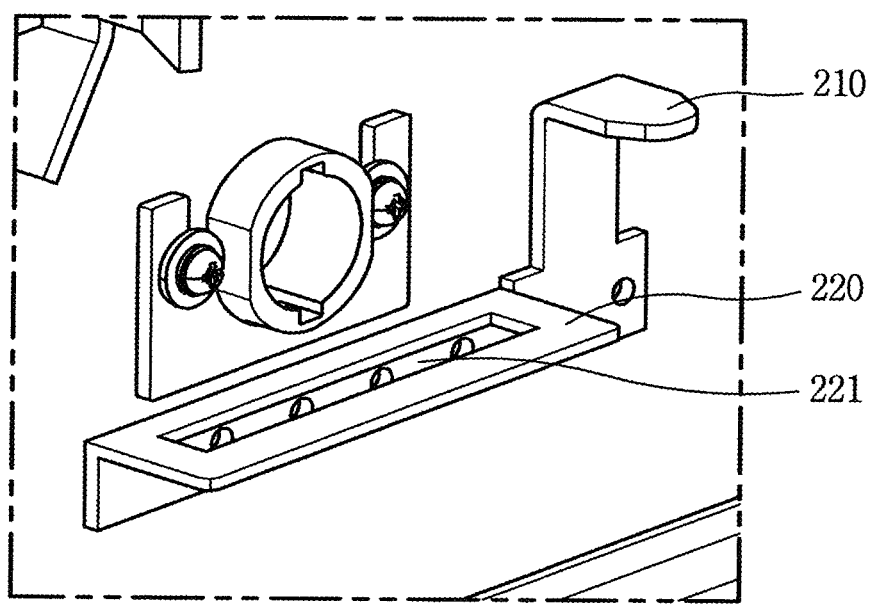
FIG. 16 is an enlarged perspective view illustrating a pressing plate and a fitting plate of the transformer position adjustment preventing device of a switchboard according to an embodiment.
Figure 17:
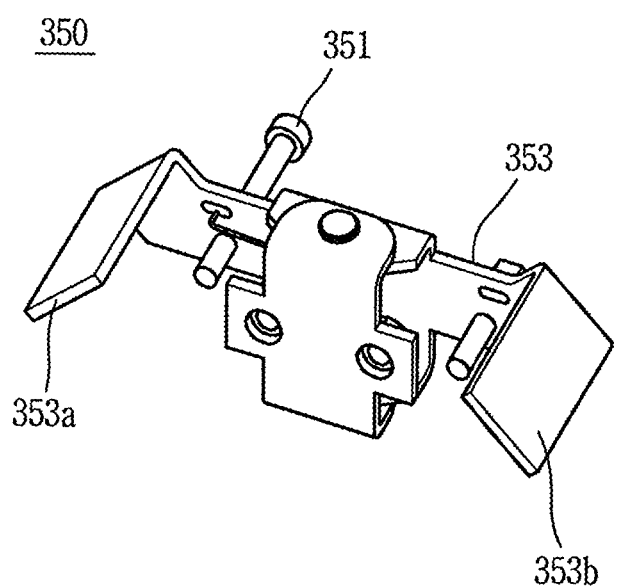
FIG. 17 is a perspective view illustrating a rotation adjusting member of the transformer position adjustment preventing device of a switchboard according to an embodiment.

A pressing plate 210 that can press the restricting member 340 may be disposed on the door 200, as illustrated in FIG. 16. The pressing plate 210 may be disposed in the rear surface side of the door 200 such that a part thereof protrudes in a rearward direction.

The restricting member 340 includes a body plate 341, a contact rod 343, and a rotating member stopper 345.

The body plate 341 may be rotatably connected to the inside of the case 310 and able to be rotated by receiving the elastic force of the elastic member 347. The body plate 341 may be rotatably connected to a hinge unit 349 inside the case 310. The body plate 341 may be rotated about the hinge unit 349. The body plate 341 may be rotated about a vertical central axis.

The body plate 341 is rotated in a direction of the rotating member or in an opposite direction of the rotating member by receiving the elastic force of the elastic member 347 disposed in the hinge unit 349. Here, the direction of the rotating member may be a forward direction in which the rotating member is disposed, and a direction opposed thereto may be a rearward direction. The elastic member 347 may be disposed in the hinge unit 349, and the body plate 341 may be a torsion spring that elastically supports the body plate 341 to allow the body plate 341 to be rotated about the hinge unit 349 in a forward direction. That is, the elastic member 347 may provide elastic force such that the body plate 341, contact rod 343, and rotating member stopper 345 are rotated in a forward direction.

The contact rod 343 may be disposed on the body plate 341 to correspond to the pressing plate 210. The contact rod 343 extends toward a door 200 from the body plate 341. Therefore, when the door 200 is closed, the contact rod 343 may be moved in an opposite direction (that is, a rearward direction) of the rotating member 330 according to the movement of the door 200 while being in contact with the pressing plate 210; and when the door 200 is opened, the contact rod 343 may be moved toward the rotating member 330 (that is, a forward direction) along the body plate 341 rotated by the torsion spring 347.

The contact rod 343 may include a contact plate 343a contacting the pressing plate 210 and bent vertically. The contact plate 343a may help the pressing plate 210 to come in contact therewith without skidding. The contact rod 343 may include a protruding plate protruding in forward and rearward directions from the body plate 341, and the contact plate 343a vertically bent at the front end of the protruding plate.

The contact rod 343, while being strongly in contact with the pressing plate 210 through the pressing plate 343a, is rotated in association with the opening or closing of the door 200.

The contact rod 343 may help interaction between the body plate 341 and the pressing plate 210 when the door 200 is opened or closed.

One or more rotating member stoppers 345 are installed on the body plate 341 to be moved toward the rear of the rotating member 330 according to the movement of the body plate 341 when the door 200 is closed, and to be moved to a rotating member 330 direction according to the rotation of the body plate 341 when the door 200 is opened, thereby restricting the rotation of the rotating member 330.

The rotating member stopper 345 may include a contact plate contacting the body plate 341, and a pair of protrusion portions protruding in a forward direction from the contact plate.

The contact plate may be coupled to the body plate 341 through a coupling member such as a screw and a pin.

The pair of protrusion portions may be vertically bent with respect to the contact plate. The pair of protrusion portions may be spaced apart from each other. One of the protrusion portions may limit a clockwise rotation of the rotating member 330, and the other may limit a counterclockwise rotation of the rotating member 330.

A spaced distance between the pair of protrusion portions may be shorter than a long-direction length of each of the first and second rotary bars 331 and 332, and may be longer than each a short-direction width of each of the first and second rotary bars 331 and 332.

The pair of protrusion portions may be spaced by an interval that is shorter than the long-direction length of the first rotary bar 331 and spaced by an interval that is larger than the short-direction width of the first rotary bar 331. The pair of protrusion portions may be spaced by an interval that is shorter than the long-direction length of the second rotary bar 333 and spaced by an interval that is larger than the short-direction width of the second rotary bar 333.

The rotating member stopper 345 may be disposed between a part of the body plate 341 connected to the hinge unit 349 and a part where the contact rod 343 protrudes.

The rotating member stopper 345 limits the rotation of the rotating member 330 when the rotating member 330 is rotated, and may be moved to a first position (that is, a restricting position) at which the rotation of the rotating member 330 is limited, and to a second position (that is, a restriction releasing position) at which the rotation of the rotating member 330 is not disrupted.

When the position displaying unit 320 is located at the test position, the first rotary bar 331 may be located at a position at which the handle insertion unit 311 is closed. Here, if the door 200 is closed, the pressing plate 210 comes in contact with the contact rod 343, the contact rod 343 is moved toward the rear of the rotating member 330 by the pressing plate 210, and the rotating member stopper 345 is also moved toward the rear of the rotating member 330.

Here, a user may open the door 200 installed on the switchboard, and contacting of the pressing plate 210 with the contact rod 343 is released while the pressing plate 210 is moving together with the door 200. When the contacting of the pressing plate 210 with the contact rod 343 is released, the restricting member 340 receives the elastic force of the elastic member 347 in the case 310 and is rotated about the hinge unit 349 in a direction of the rotating member 330 (a forward direction). When the restricting member 340 is rotated, the rotating member stopper 345 is moved toward the rotating member 330 and is simultaneously disposed to protrude around the first rotary bar 331 of the rotating member 330, and the rotating member 330 may be limited to not be freely rotated by the rotating member stopper 345.

Even when a user rotates the rotor 324 provided in the position displaying unit 320, the rotating member 330 comes in contact with the rotating member stopper 345 and the rotation of the rotating member 330 is thus limited.

While the door 200 is opened, a worker is unable to open the handle insertion unit 311 closed by the first rotary bar 331 and insert the operation handle into the handle insertion unit 311, and is thus unable to adjust the position of the transformer truck 500.

The width of each of the first and second rotary bars gradually increases from one side at which the first rotary bar 331 and second rotary bar 333 of the rotating member 330 are connected to each other toward the other side.

The first rotary bar 331 is disposed such that the handle insertion unit 311 is closed when the rotor 324 is located at the test position, and the second rotary bar 333 is rotated in association with the rotor 324 when the rotor is rotated from the test position to the operation position so that the handle insertion unit 311 is re-closed.

Accordingly, when the rotor 324 is located at the test position and the door 200 is opened, the rotating member stopper 345 protrudes around the first rotary bar, so that the rotation of the rotating member 330 can be restricted, and the closed state of the handle insertion unit 311 cannot be released, thereby making it impossible to adjust the position of the transformer truck 500.

Moreover, when the rotor 324 is located at the test position and the door 200 is closed, the rotating member stopper 345 is moved toward the rear from the periphery of the first rotary bar 331, the restriction of the rotating member 330 through the rotating member stopper 345 is released, and the rotating member 330 is able to be rotated. When the rotor 324 is rotated from the test position to the operation position, the rotating member 330 is rotated to a position for opening the handle insertion unit 311 in association with the rotor 324, and a worker may insert the operation handle into the handle insertion unit 311 to adjust the position of the transformer truck 500 from the test position to the operation position.

A second rotary bar extension rod 335 may be rotatably connected to the second rotary bar 333. Furthermore, a fitting plate 220 having a fitting hole 221 may be disposed in the door 200.

Figure 11:
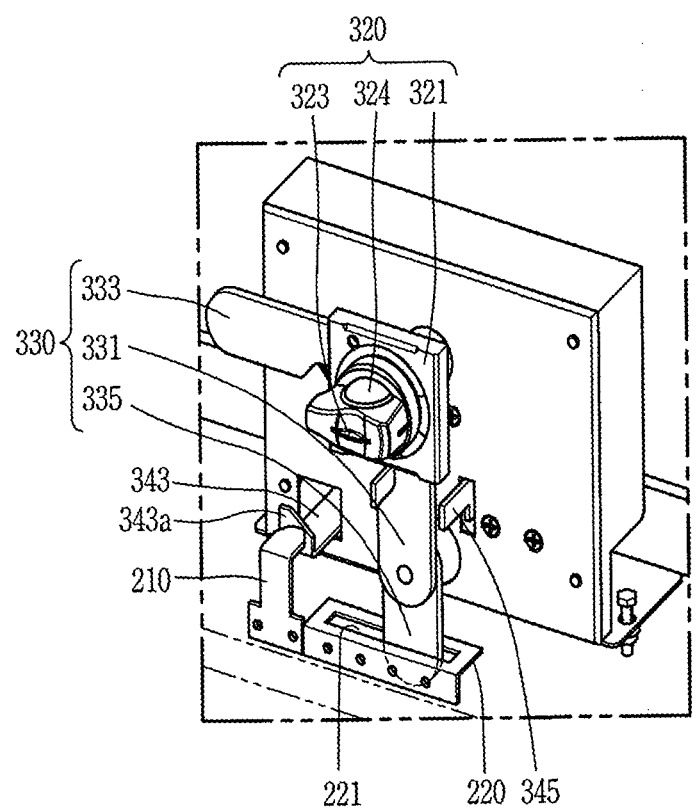
FIG. 11 is a perspective view illustrating a state in which an operation displaying unit of the transformer position adjustment preventing device of a switchboard according to an embodiment is at an operation position and a door is closed.
Figure 12:
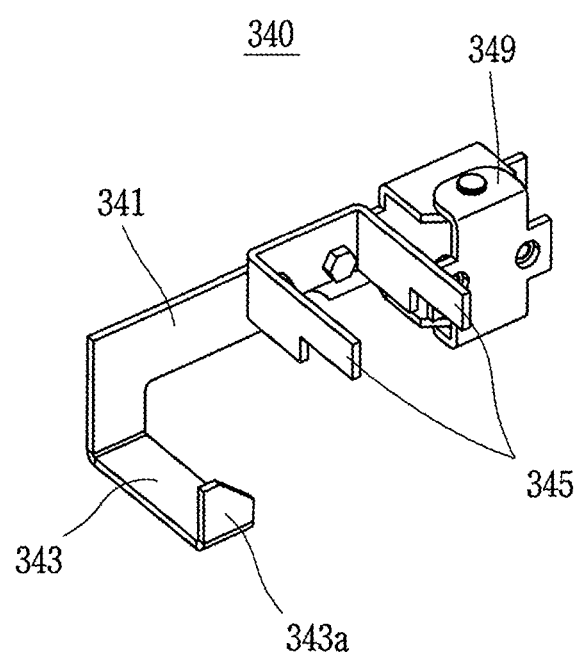
FIG. 12 is a perspective view illustrating a restricting member of the transformer position adjustment preventing device of a switchboard according to an embodiment.
Figure 13:
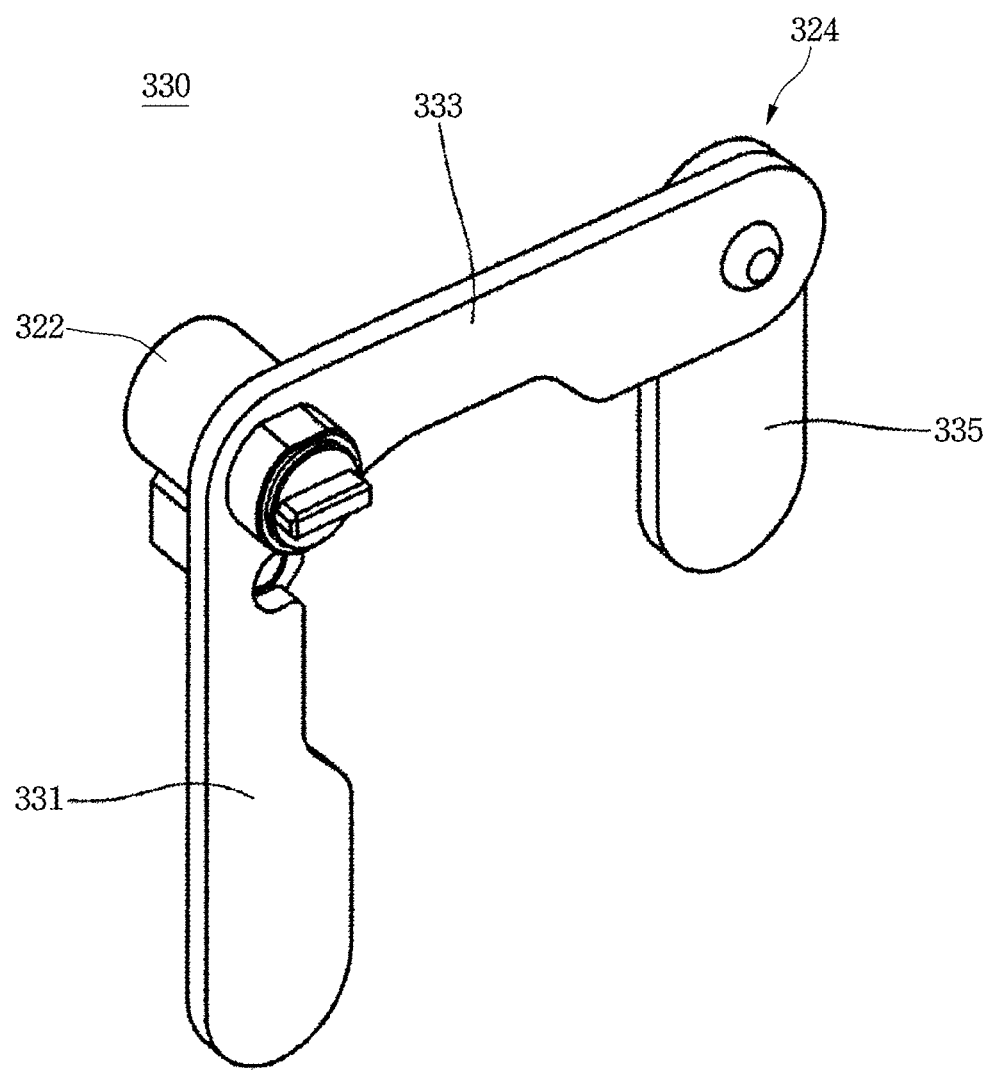
FIG. 13 is a perspective view illustrating a rotating member of the transformer position adjustment preventing device of a switchboard according to an embodiment.
Figure 14:
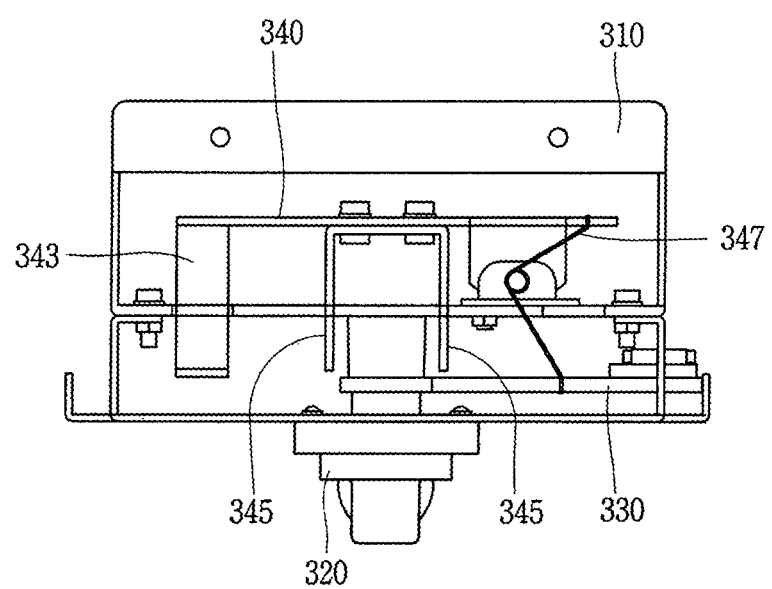
FIG. 14 is a plan view illustrating the inside of the transformer position adjustment preventing device of a switchboard according to an embodiment.
Figure 15:
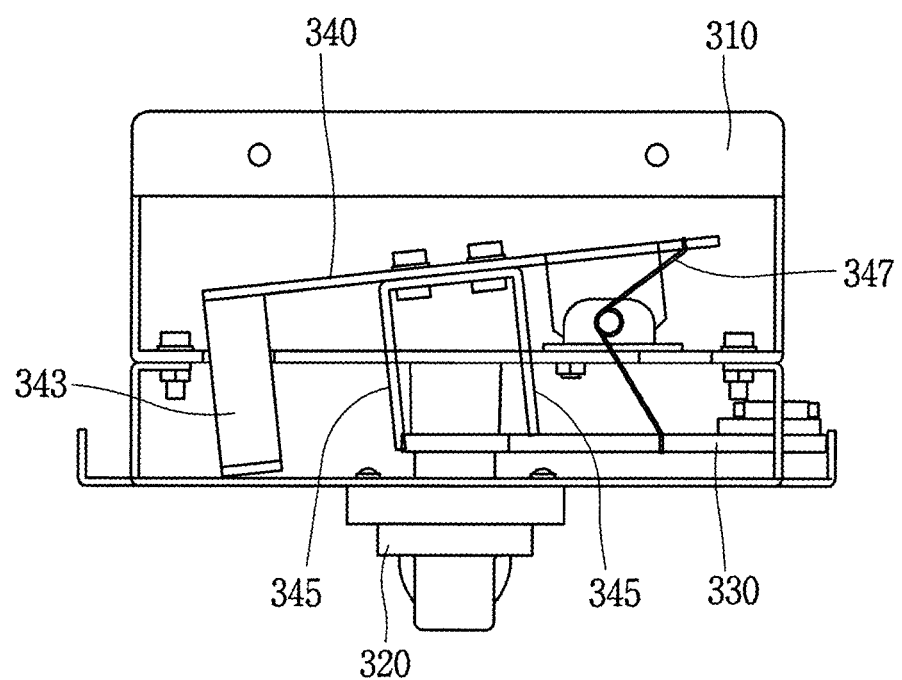
FIG. 15 is a plan view illustrating a state in which the restricting member in FIG. 14 is rotated in a forward direction.

As illustrated in FIG. 11, the rotor 324 may be rotated to be located at the operation position while the door 200 is closed. Here, the second rotary bar extension rod 335 may be fitted into the fitting hole 221, and the opening of the door 200 may be prevented through the second rotary bar extension rod 335.

When the second rotary bar extension rod 335 is rotatably connected to the second rotary bar 333, the second rotary bar extension rod 335 may be downwardly bent when the second rotary bar 333 is horizontally disposed.

If one long second rotary bar is directly inserted into the fitting hole 221 of the fitting plate 220, the total volume of the transformer position adjustment preventing device 300 becomes large. On the other hand, when the second rotary bar extension rod 335 is rotatably connected to the second rotary bar 333, the total volume of the transformer position adjustment preventing device 300 may be minimized.

Moreover, even when the position displaying unit 320 is not completely rotated from the test position to the operation position but rotated only at a certain angle, the rotating member 330 is rotated clockwise by virtue of the self-loads of the second rotary bar 333 and second rotary bar extension rod 335 without being provided with a separate rotary force, so that the second rotary bar extension rod 335 is fitted into the fitting hole 221 and the position displaying unit 320 is simultaneously rotated to the operation position. Thus, the rotating member 330 may be easily rotated to the operation position through the position displaying unit 320, and it is automatically rotated to the operation position through the self-load when the rotating member 330 is not completely located at the operation position, thereby preventing malfunction in use.

Referring to FIGS. 17 to 23, a transformer position adjustment preventing device 300 may further include a rotation adjusting member 350. The rotation adjusting member 350 may be rotatably disposed over the restricting member 340 and is rotated when the position of the transformer truck 50 is changed, so that the rotation of the rotating member 300 may be limited.

The truck cover 510 is disposed on the front surface of the transformer truck 500, and when the transformer truck 500 is moved, the truck cover 510 pushes the rotation adjusting member 350 to restrict the rotation of the rotating member 330.

The rotation adjusting member 350 includes a contact pin 351 and a rotary bar 353 connected to the contact pin 351.

The contact pin 351 may be protrusively disposed on the case 310 toward the truck cover 510, and may be in contact with the truck cover 510 or contact may be released according to the movement of the transformer truck 500 to the test position or operation position.

The rotary bar 353 may be connected to the contact pin 351 and rotated by the contact pin 351. A first rotation adjusting plate 353a may be formed to protrude toward the rotating member 330 at one side of the rotary bar 353, and a second rotation adjusting plate 353b may be formed to protrude toward the rotating member 330 at the other side of the rotary bar 353.

The first rotation adjusting plate 353a and second rotation adjusting plate 353b are formed to be inclined at a certain angle. The first rotation adjusting plate 353a and second rotation adjusting plate 353b may be formed such that a distance therebetween becomes smaller from bottom to top.

The center of the rotary bar 353 may be rotatably connected to the hinge unit equipped in the case 310. The rotary bar 353 may be rotatably disposed about a vertical central axis. The hinge unit may be disposed between the first rotation adjusting plate 353a and the second rotation adjusting plate 353b.

Figure 21:
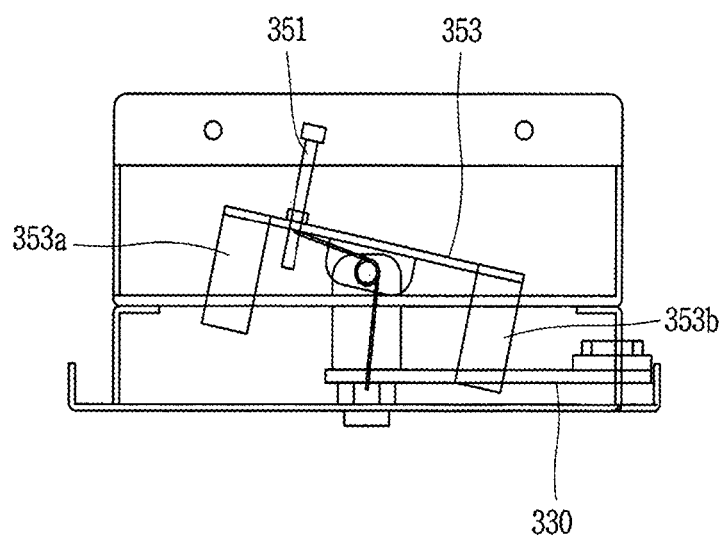
FIG. 21 is a plan view illustrating the inside of the transformer position adjustment preventing device of a switchboard according to an embodiment while a transformer truck is located at an operation position.

A torsion spring that elastically supports the rotary bar 353 may be disposed in the case 310, as illustrated in FIG. 21. The torsion spring may be installed to allow the second rotation adjusting plate 353b to be elastically supported toward the rotating member 330 when an external force is not applied to the contact pin 351. The torsion spring may be compressed by the rotary bar 353 when the contact pin 351 is forwardly pushed, and the torsion spring may push the rotary bar 354 to move the contact plate 351 in a rear direction when an external force is not applied to the contact pin 351.

Figure 19:
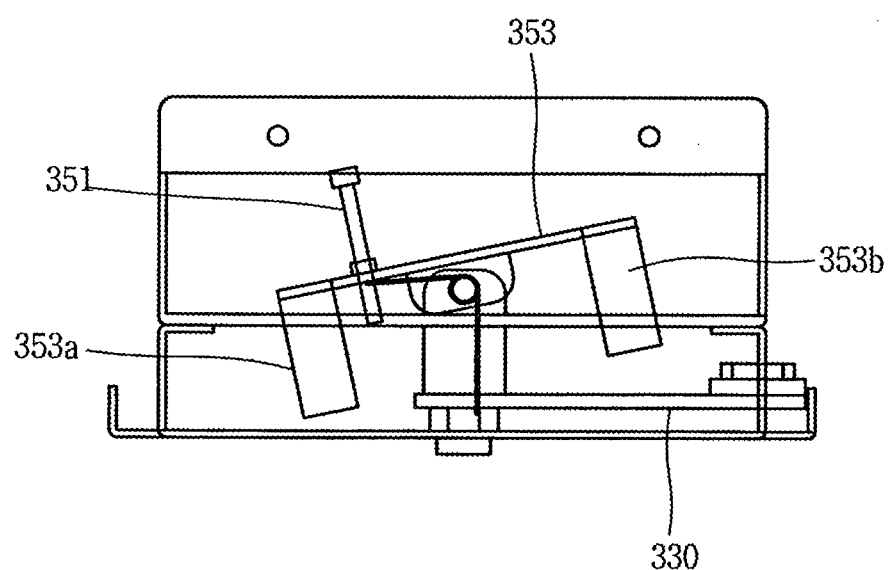
FIG. 19 is a plan view illustrating the inside of the transformer position adjustment preventing device of a switchboard according to an embodiment while a transformer truck is located at a test position.

When the transformer truck 500 is moved to the test position, the truck cover 510 pushes the contact pin 351 and the rotary bar 353 is rotated as illustrated in FIG. 19 such that the first rotation adjusting plate 353a is moved in a forward direction. Here, a part of the first rotation adjusting plate 353a is collinearly disposed with the rotating member 330 and may protrude around the rotating member 330, and the first rotation adjusting plate 353a may limit the vertical rotation of the rotating member 330.

Figure 22:
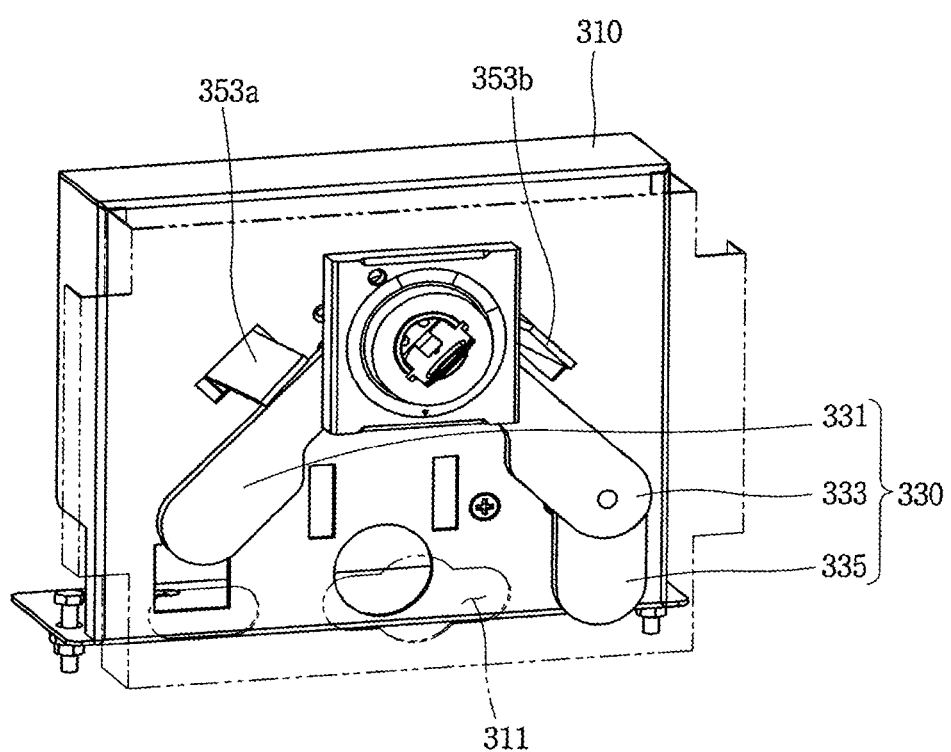
FIG. 22 is a perspective view illustrating the transformer position adjustment preventing device when a position displaying unit is rotated at a certain angle while a truck is located at a test position.

In order to rotate the rotating member 330 to the operation position while the first rotation adjusting plate 353a protrudes around the rotating member 330, the first rotary bar 331 may come in contact with and caught by the first rotation adjusting plate 353a illustrated in FIG. 22, and the rotation of the rotating member 330 to the operation position may be limited.

When the rotation of the rotating member 330 is limited, the rotation of the rotor 324 connected to the rotating member 330 may be limited, and a user cannot change the rotor 324 from the test position to the operation position.

When the transformer truck 500 is moved to the operation position, the contact of the truck cover 510 with the contact pin 351 is released and the rotary bar 353 is reversely rotated as illustrated in FIG. 21 such that the second rotation adjusting plate 353b is moved forwardly. Here, a part of the second rotation adjusting plate 353b is collinearly disposed with the rotating member 330 to protrude around the rotating member 330, and the second rotation adjusting plate 353b may limit the vertical rotation of the rotating member 330.

Figure 23:
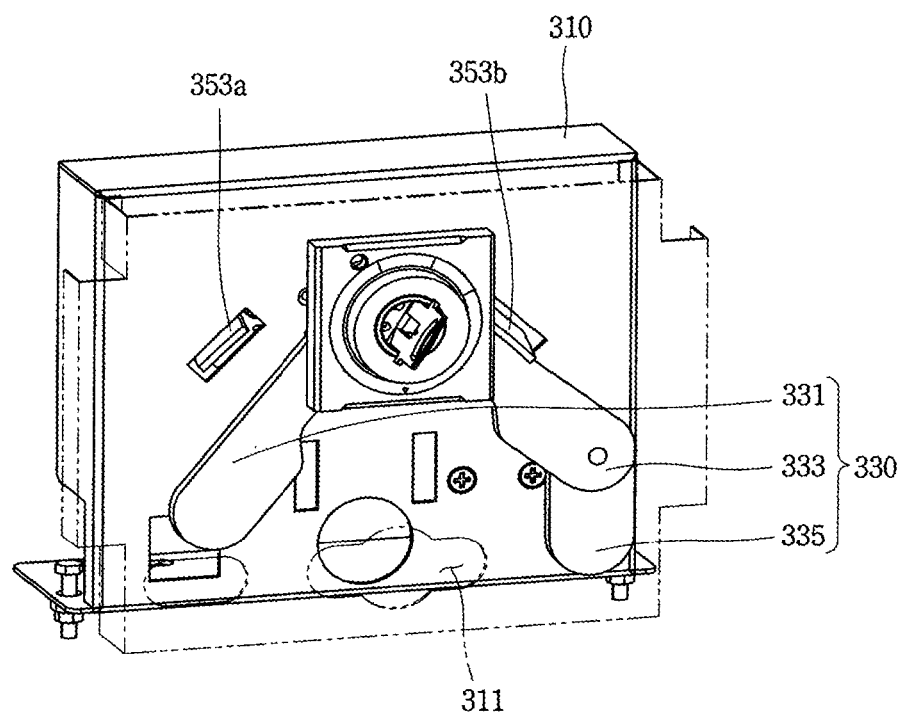
FIG. 23 is a perspective view illustrating the transformer position adjustment preventing device when a position displaying unit is rotated at a certain angle while a truck is located at an operation position.

In order to rotate the rotating member 330 to the test position while the second rotation adjusting plate 353b protrudes around the rotating member 330, the second rotary bar 333 may come in contact with and caught by the second rotation adjusting plate 353a illustrated in FIG. 23, and the rotation of the rotating member 333 to the test position may be limited.

When the rotation of the rotating member 330 is limited, the rotation of the rotor 324 connected to the rotating member 330 may be limited, and thus a user cannot change the rotor 324 from the operation position to the test position.

That is, when the transformer truck 500 is disposed at the test position, the rotation adjusting member 350 may allow the rotor 324 not to be rotated to the operation position, and when the transformer truck 500 is disposed at the operation position, the rotation adjusting member 350 may allow the rotor 324 not to be rotated to the test position.

By means of the limitation of rotation of the rotor 324, a user may recognize the position of the transformer truck 500 from the outside and easily recognize the current position of the transformer truck 500 even without opening the door 200.

In the present disclosure, when the transformer truck 500 is located at the test position or operation position, the restricting member 340 is disposed to protrude toward a rotating member 330 when the door 200 is opened, and the rotation of the rotating member 300 is restricted through the restricting member 340, so that a change in a closed state of the handle insertion unit 311 through the rotating member 330 is prevented, so that the position of the transformer truck 500 is prevented from being adjusted by the insertion of a handle for operation through the handle insertion unit 311.

Furthermore, when the transformer truck 500 is located at the operation position, the second rotary bar 333 of the rotating member 330 is fitted into the fitting hole 221 defined in the door 200, so that the opening of the door 200 is prevented when the transformer truck 500 is located at the operation position. Consequently, a worker can be prevented from encountering electric shock.

In addition, the width of each of the first and second rotary bars 331 and 333 gradually increases from one side in which the first rotary bar 331 and second rotary bar 333 are connected to each other to the other side. Accordingly, an occupation space is minimized and strength is simultaneously reinforced, and the handle insertion unit 311 is effectively opened or closed through the first rotary bar 331 and second rotary bar 333.

Exemplary embodiments have been described above, but in the present disclosure it is clear that various variations, modifications, and equivalents can be used and the embodiment can be appropriately varied to be equally applied. Accordingly, the descriptions above do not limit the scope of the present invention, which is determined by the limitation of the claims below.

What is claimed is:

1. A transformer position adjustment preventing device of a switchboard, the transformer position adjustment preventing device comprising:
    a case having a handle insertion unit;
    a position displaying unit disposed on the case and displaying a test position or an operation position of a transformer truck with a transformer seated thereon;
    a rotating member disposed on the case, connected to the position displaying unit, rotated by the rotation of the position displaying unit to open or close the handle insertion unit; and
    a restricting member rotated in a direction of the rotating member or an opposite direction of the rotating member according to opening or closing of a door configured to open and close the transformer chamber in which the transformer truck is positioned, so as to restrict the rotation of the rotating member or release the restriction state.

2. The transformer position adjustment preventing device according to claim 1,
    wherein the position displaying unit comprises:
    a front cover having a displaying unit to display a test position or an operation position of the transformer truck, and a catch groove to correspond to the test position or operation position;
    a rotor rotatably fitted into the front cover and having a through-hole defined in the center thereof; and
    a locking body disposed to pass through the through-hole and having a first catch protrusion to be selectively fitted into the catch groove.

3. The transformer position adjustment preventing device according to claim 2,
    wherein the front cover has a box shape,
    the displaying unit is disposed on the front surface of the front cover, and
    the catch groove is defined inside the front cover.

4. The transformer position adjustment preventing device according to claim 2, wherein the rotating member is connected to the rotor.

5. The transformer position adjustment preventing device according to claim 2,
    wherein a catch projection protruding toward the through-hole is provided on the rotor, and
    a second catch protrusion, contacting the catch projection when forwardly moved, is provided on the locking body.

6. The transformer position adjustment preventing device according to claim 2,
    wherein an elastic member seating groove is further defined in the rear of the locking body, and
    the position displaying unit further comprises an elastic member that elastically supports the locking body, the elastic member being seated in the elastic member seating groove.

7. The transformer position adjustment preventing device according to claim 1, wherein a pressing plate capable of pressing the restricting member is protrusively disposed on the door.

8. The transformer position adjustment preventing device according to claim 7,
    wherein the restricting member comprises:
    a body plate rotatably connected to the inside of the case, and rotated by receiving the elastic force of an elastic member;
    a contact rod disposed on the body plate to correspond to the pressing plate and extending toward the door, so that the contact rod is moved toward the rear of the rotating member according to the movement of the door while being in contact with the pressing plate when the door is closed and the contact rod is moved toward the rotating member according to the rotation of the body plate when the door is opened; and
    one or more rotating member stoppers disposed on the body plate and restricting the rotation of the rotating member by moving toward the rear of the rotating member according to the movement of the body plate when the door is closed and by moving toward the rotating member according to the rotation of the body plate when the door is opened.

9. The transformer position adjustment preventing device according to claim 8, wherein a contact plate that contacts the pressing plate and is bent vertically is disposed on the contact rod.

10. The transformer position adjustment preventing device according to claim 8,
    wherein the body plate is rotatably connected to a hinge unit in the case, and
    the elastic member is a torsion spring that elastically supports the body plate to allow the body plate to be rotated about the hinge unit in a forward direction.

11. The transformer position adjustment preventing device according to claim 8, wherein the rotating member comprises:
    a first rotary bar; and
    a second rotary bar forming a curved shape together with the first rotary bar.

12. The transformer position adjustment preventing device according to claim 11, wherein the first rotary bar and second rotary bar cross each other at a right angle.

13. The transformer position adjustment preventing device according to claim 11, wherein the rotating member stopper includes a pair of protrusion portions spaced from each other, and a spaced distance between the pair of protrusion portions is shorter than a long-direction length of each of the first and second rotary bars and is longer than a short-direction width of each of the first and second rotary bars.

14. The transformer position adjustment preventing device according to claim 11, wherein the rotating member stopper is forwardly moved to a position at which the rotation of the first rotary bar is restricted when the position displaying unit is located at the test position and the door is opened, and
    is backwardly moved to a position at which the restriction of the rotating member is released when the position displaying unit is located at the test position and the door is closed.

15. The transformer position adjustment preventing device according to claim 11, wherein a second rotary bar extension rod is rotatably connected to the second rotary bar, and a fitting plate having a fitting hole is disposed on the door, wherein the second rotary bar extension rod is fitted into the fitting hole to limit the opening of the door when the rotor is rotated to the operation position while the door is closed.

16. The transformer position adjustment preventing device according to claim 11, wherein a width of each of the first and second rotary bars gradually increases from one side in which the first rotary bar and second rotary bar are connected to each other to the other side.

17. The transformer position adjustment preventing device according to claim 1, wherein a transformer girder is disposed in the front of the transformer truck, and a mounting plate on which the case is placed is disposed on the transformer girder.

18. A transformer position adjustment preventing device of a switchboard, the transformer position adjustment preventing device comprising:

a case having a handle insertion unit;

a position displaying unit provided on the case and displaying a test position or an operation position of a transformer truck with a transformer seated thereon;

a rotating member disposed on the case, connected to the position displaying unit, rotated by the rotation of the position displaying unit to open or close the handle insertion unit;

a restricting member rotated in a direction of the rotating member or an opposite direction of the rotating member according to opening or closing of a door configured to open and close the transformer chamber in which the transformer truck is positioned, so as to restrict the rotation of the rotating member or release the restriction state;

a pressing plate disposed on the door to press the restricting member; and a fitting plate disposed on the door and having a fitting hole into which the rotating member is inserted and fitted.

19. The transformer position adjustment preventing device according to claim 18, wherein the position displaying unit comprises:

a front cover having a displaying unit to display a test position or an operation position of the transformer truck, and a catch groove to correspond to the test position or operation position;

a rotor rotatably fitted into the front cover, having a through-hole defined in the center thereof, and having a catch projection to protrude toward the through-hole; and a locking body disposed to pass through the through-hole, having a first catch protrusion to be selectively fitted into the catch groove, and having a second catch protrusion formed to contact the catch projection.

20. The transformer position adjustment preventing device according to claim 18, wherein the restricting member comprises:

a body plate rotatably connected to the inside of the case, and rotated by receiving the elastic force of an elastic member;

a contact rod disposed on the body plate to correspond to the pressing plate and extending toward the door, so that the contact rod is moved toward the rear of the rotating member according to the movement of the door while being in contact with the pressing plate when the door is closed and the contact rod is moved toward the rotating member according to the rotation of the body plate when the door is opened; and one or more rotating member stoppers disposed on the body plate and restricting the rotation of the rotating member by moving toward the rear of the rotating member according to the movement of the body plate when the door is closed and by moving toward the rotating member according to the rotation of the body plate when the door is opened.

* * * * *